Nov. 24, 1942.    R. R. FINN    2,303,299
RULING ENGINE
Filed March 18, 1941    3 Sheets-Sheet 1

Inventor
Robert R. Finn
by Wright, Brown, Quinby & May
Attys.

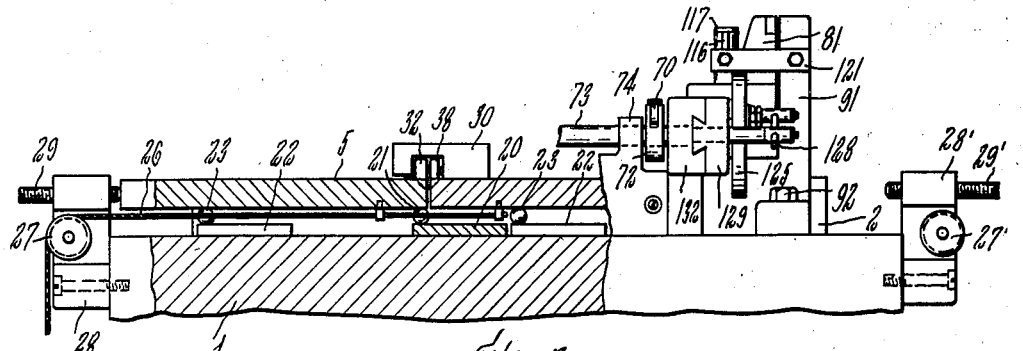
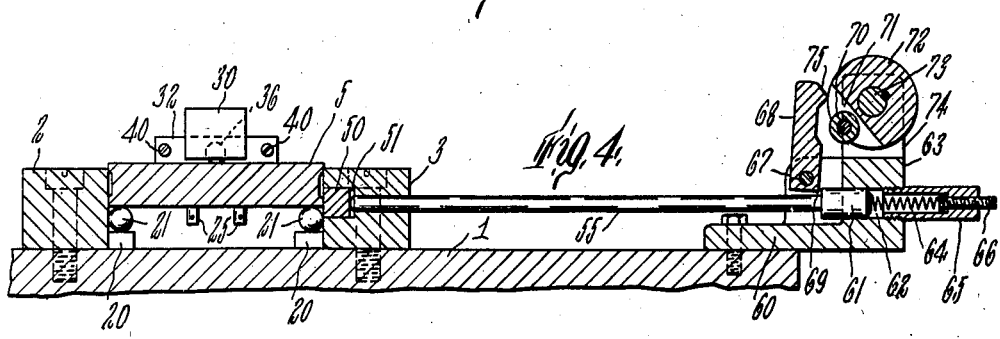
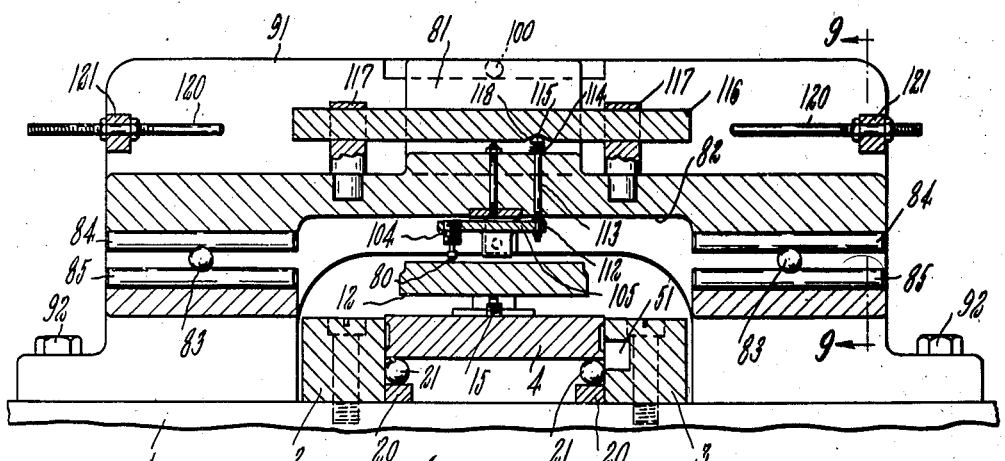

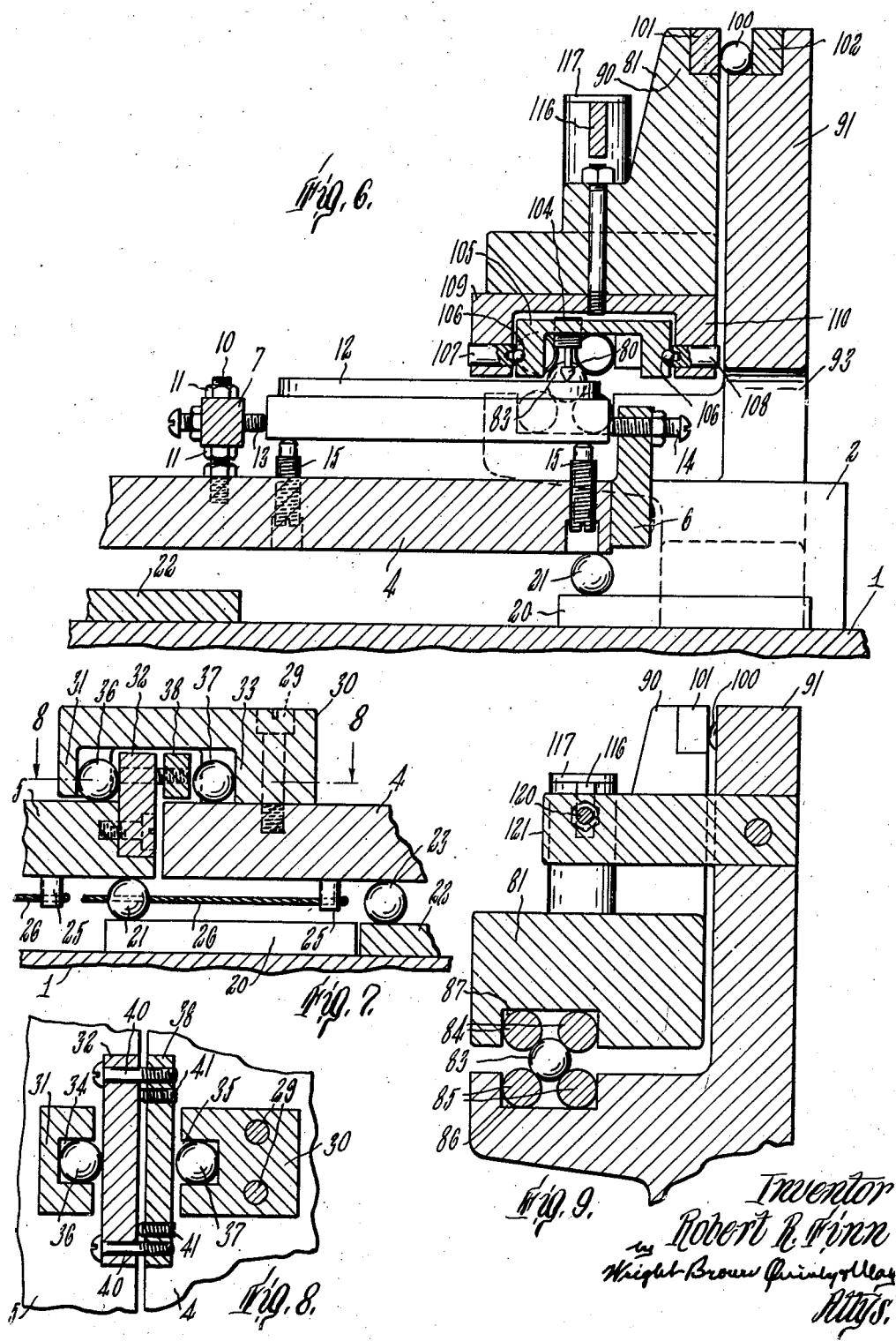

Patented Nov. 24, 1942

2,303,299

UNITED STATES PATENT OFFICE 2,303,299

RULING ENGINE

Robert R. Finn, Springfield, Vt.

Application March 18, 1941, Serial No. 383,971

14 Claims. (Cl. 33—19)

This invention relates to ruling machines commonly called "ruling engines" and has for an object to provide such a machine of relatively low cost but which is capable of high accuracy.

More particularly this invention has for an object the production of a ruling machine of sufficient accuracy so that it may be used for ruling diffraction gratings. A diffraction grating possesses a highly polished optically flat reflecting surface with closely spaced parallel lines serving to break up any light applied to the surface. The spacing of the lines must be extremely accurate and there may be on the order of 15,000 to 20,000 lines per inch. Beside requiring a machine of very high accuracy to rule satisfactorily for this purpose, it is necessary to mount such machines on pedestals set into the ground in places away from traffic or other disturbances and to house the machines in constant temperature enclosures.

Ruling machines are commonly provided with fed screws for spacing the lines, but the manufacture of such screws of sufficient accuracy for ruling diffraction gratings presents very great obstacles and there is no way to test the accuracy of the screw except by trial in making the gratings. The greater the length of the screw, the greater are these difficulties. Moreover, intermittent feed devices for such screws afford other sources of error most difficult to overcome.

A further object of this invention, therefore, is to provide feed mechanism of a simple nature which requires no lead screws or intermittent rotation of feed elements.

A still further object of this invention is to overcome as much as possible the variable effects of friction and incident to the use of lubricants, which latter are entirely avoided in accordance with this invention.

For a more complete understanding of this invention, reference may be had to the accompanying drawings in which Figure 1 is a top plan view of one embodiment.

Figure 2 is a right hand end elevation of the same.

Figures 3 to 7, inclusive, are sectional views on the correspondingly numbered section lines of Figure 1.

Figure 8 is a detail section on line 8—8 of Figure 7, and

Figure 9 is a detail section on line 9—9 of Figure 5.

Figure 1:
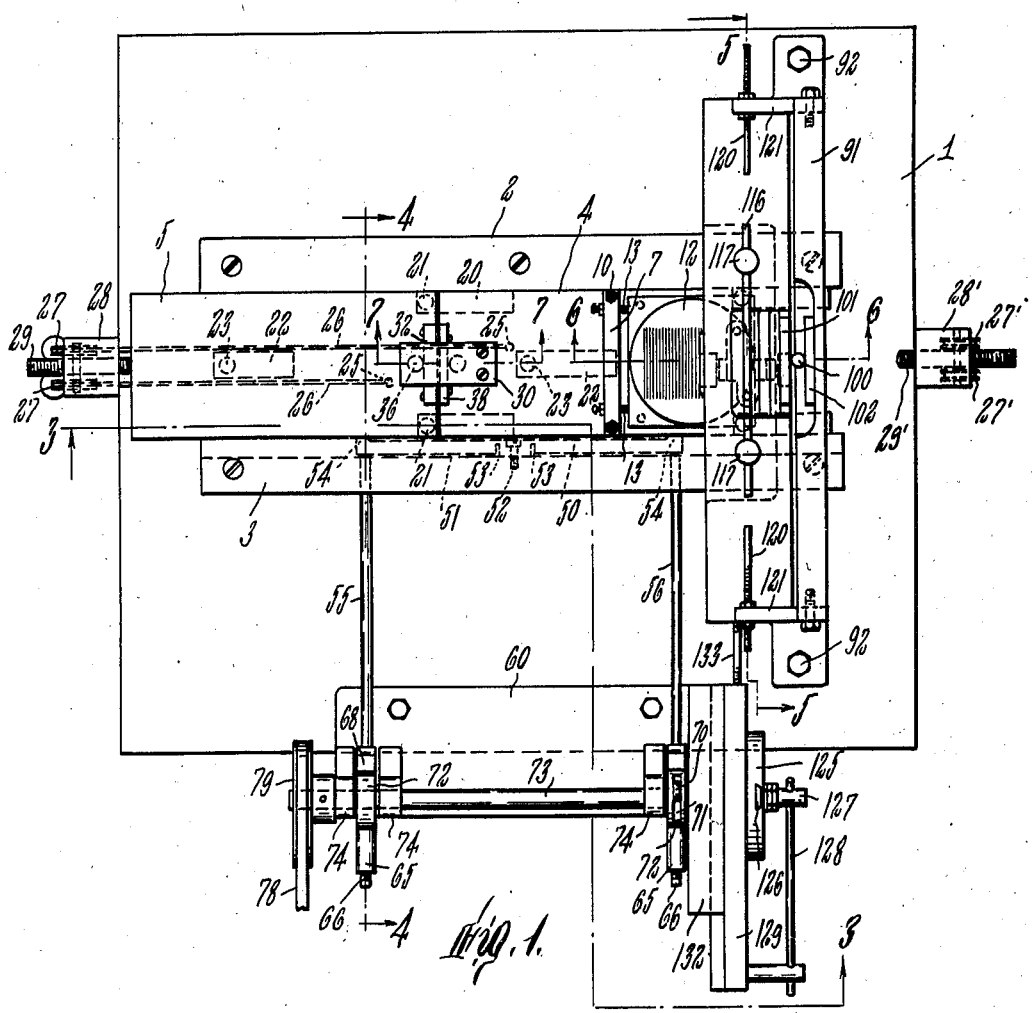
Figure 2:
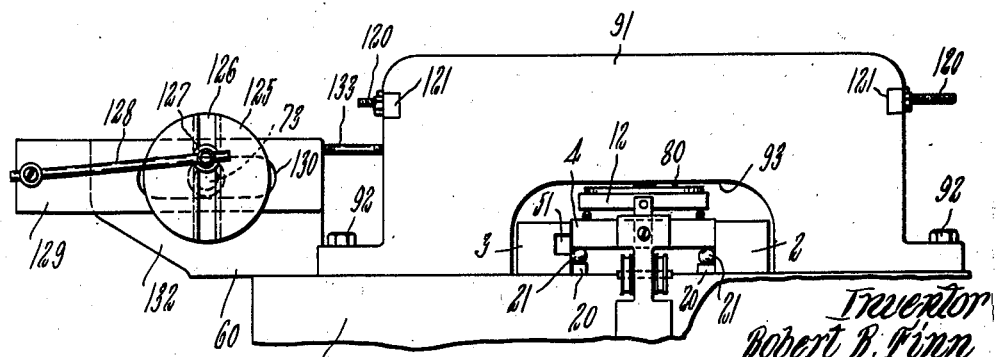

Referring to the drawings, the ruling machine or engine comprises a flat support 1 to the top face of which are secured in parallel relation guide bars 2 and 3. Between these guide bars are arranged a pair of carriages 4 and 5. Carriage 4 may be termed a "work carriage" since it is provided with means for supporting the work to be ruled. As shown this work support comprises an end upstanding wall member 6 secured to the work carriage and spaced therefrom a cross bar 7. This cross bar is adjustably secured vertically, with respect to the carriage 4 by means of end adjusting studs 10 having their lower ends threaded into the upper face of the carriage 4 at opposite sides and carrying nuts 11 above and below the cross bar 7.

The work herein shown as a diffraction grating 12 is supported horizontally between a pair of adjusting screws 13 spaced apart and near the ends of the bar 7 and a single central adjusting screw 14 in the bar 6. The work 12 rests upon three leveling screws 15 in threaded openings through the carriage 4 and accessible from beneath for adjustment. By this means the optically flat top surface of the work may be lined up properly with relation to the marking tool, which will later be described, so that markings of uniform depth may be produced over the various portions of the surface of the grating.

The two carriages 4 and 5, carriage 5 being termed herein a "stop carriage," are guided for linear motion by the guide bar 2, the guide bar 3 being positioned spaced from the guide bar 2 so as to permit motion of the carriages along the bar 2, but without substantial lost motion. These carriages 4 and 5 are each mounted on three point roller bearings of a type which require no lubrication. For this purpose accurately formed rails 20 are positioned inwardly of each of the bars 2 and 3 and on each of these rails is positioned a ball 21 for each of the slides 4 and 5. Substantially centrally between the guide bars 2 and 3 are rails 22 for supporting a central ball 23 for each of these carriages. The top faces of these rails 20 and 22 are accurately flat and the carriages rest on the balls 21 and 23 by gravity.

Each carriage is provided with means independent of the other tending to feed it in one direction along the guide rail 2. To this end each of the carriages has a post 25 depending therefrom to which is attached one end of a cord or cable 26. The posts are offset laterally from each other so that the cords 26 do not conflict with each other and these cords are brought over spaced pulleys 27 journaled in a bracket 28 secured to one edge of the support 1. Suitable weights (not shown) are hung to the lower ends of these cords or cables 26. A stop screw 29 limits the extent of motion of the adjacent carriage.

Means are provided for connecting the carriages 4 and 5 for a limited lost motion, the extent of this lost motion determining the extent of feed of the work carriage 4 at each feeding or indexing action, and thus determining the space between the lines ruled on the grating. This lost motion connection is illustrated best in Figures 7 and 8. One of the carriages 4 and 5, herein shown as the carriage 4, has secured to its top face as by screws 29 a U shaped yoke member 30, this yoke member having a downwardly turned end 31 projecting over the rear edge of the other carriage, such as 5. This other carriage is provided with an upstanding abutment bracket 32 which extends above its upper face and in between the portion 31 of the yoke 30 and another portion 33 spaced from the portion 31. The portions 31 and 33, as shown best in Figure 8, are provided with opposed notches 34 and 35, respectively, within each of which rides a ball 36, 37, respectively. The ball 36 rides between the member 31 and the abutment 32, while the ball 37 rides between the portion 33 and a striker piece 38 adjustably secured to the abutment 32. Such adjustable securement as shown comprises a pair of screws 40 extending through holes in the abutment 32 and threaded into the member 38 by which the member 38 may be drawn toward the abutment 32, and a pair of screws 41 threaded through the member 38 and having their inner ends engaging the adjacent face of the abutment 32 to limit the extent of such drawing movement or for forcing the member 38 away from the abutment 32. By this means the member 38 may be spaced accurately from the member 32, thus to adjust the amount of lost motion permitted between the carriages 4 and 5, this lost motion occurring in both directions between the members 4 and 5. At one limit of motion the abutment 32 engages the ball 36 and presses it into contact with the portion 31, and at the other limit of lost motion the member 38 presses the ball 37 into contact with the part 33.

Means are provided for alternately and independently clamping the carriages 4 and 5 against motion, and alternately releasing one of these carriages while the other is clamped and then releasing the other while the one is clamped, thereby permitting a step by step or indexing feed motion of the work carriage, each time by an amount equal to the lost motion between the two carriages. In order that this alternate holding and stopping of the motion of the carriages may be accurately accomplished, means are provided for engaging one side of each of these carriages and clamping it against the guide bar 2, which is very accurately formed, and the carriages themselves are of sufficient length so that they cannot be tilted appreciably during the course of their feed motions, or while they are clamped or released.

The clamping means shown comprises a clamp bar 50 which is seated in a recess 51 in the inner face of the guide bar 3. As shown best in Figure 1, this bar 50 is secured centrally as by the screw 52 within its recess and on each side of this screw it is slotted inwardly as at 53 to provide weakened portions which may flex when pressure is exerted on the outer ends of the bar 50. These ends of the bar 50 are widened slightly to form brake shoe portions 54 which may be pressed against the edges of the carriages 4 and 5 at suitable times to hold these carriages against motion. The inherent springiness of the bar 50 is sufficient to normally hold the shoe portions 54 out of clamping contact with its respective carriage, but they may be forced into clamping position by the motion of the thrust bars 55 and 56. Bar 55 is shown in Figure 1 as being in position to actuate the forward shoe 54 to stop the motion of the stop carriage 5, while the bar 56 similarly controls the application of the other shoe 54 to stop the motion of the work carriage 4. As shown in Figure 4, the thrust bar 55 is extended to a considerable distance from the guide bar 3 to the side of the support where this support has fixed thereto a bracket 60. This bracket 60 is provided with driving means for controlling the thrust bars 55 and 56, and also for producing cross motion of a tool carrier as will later more fully appear.

As shown in Figure 4, the outer end of the thrust bar 55 is provided with a head 61 riding in a guide opening 62 in a wall portion 63 upstanding from the bracket 60, and against the outer end of this head 61 there bears a coil spring 64 housed within a hollow plug 65 threaded into the outer end of the guide opening 62. A screw 66 threaded through the rear end of the plug 65 and having a head engaging the outer end of the spring 64 serves to adjust the pressure exerted by the spring 64 on the thrust rod 55 thus to determine the pressure exerted on the corresponding brake shoe 54 and thereby the holding force exerted to prevent the motion of the carriage 5. This pressure should be sufficient to prevent motion of this slide under the impact which this slide may receive in arresting the motion of the carriage 4 when this carriage has been released. The means for applying pressure to the thrust rod 56 may be similar to that described for the thrust rod 55. These thrust rods are retracted at suitable times to release their respective carriages and for this purpose the bracket 60 carries pivoted, as on a pin 67, a release dog 68 for each rod. The lower corner 69 of one of these release dogs may impinge upon and retract the head 61 of the thrust rod 55 and this may be effected by impingement on a nose portion 75 thereof of a roller 70 journaled in a slot 71 in a disk 72 keyed to an actuating shaft 73. This actuating shaft is journaled in spaced bearings 74 upstanding from the bracket 60 and carries two of these disks 72 arranged in different angular positions thereon, one for each of the thrust rods 55 and 56, so that as this shaft 73 is rotated as by a driving belt 78 engaging a drive pulley 79 fixed to the shaft 73, the thrust rods 55 and 56 are alternately actuated in a sequence as follows:

Assuming that the carriages 4 and 5 are in the position shown in Figure 7, both carriages being then held by their respective thrust rods 55 and 56 and shoes 54 in fixed position and with the abutment 32, the ball 36, and the yoke member 31 in engagement, the thrust rod 56 is then retracted so as to release the carriage 4 which is then pulled toward the carriage 5 until the ball 37, the portion 38, and the yoke portion 33 are in engagement, the lost motion then occurring between the abutment 32 and the portion 31 of the yoke member. This produces a slight feeding motion of the carriage 4 and the thrust rod 56 is then allowed to be pressed forward by its spring, clamping the carriage in this new position. While both carriages are clamped, the tool is caused to traverse the work in operative direction to rule it and after this traverse has been effected, the thrust rod 55 is retracted, allowing the stop carriage 5 to feed forwardly until it reaches the position shown in Figure 7 with the lost motion taken up between the abutment 32 and the yoke member 31 and occurring between the member 38 and the yoke portion 33. The carriage 5 is then clamped by the action of its spring pressed thrust rod 55 and the carriage 4 is thereafter unclamped to allow this carriage to be moved by the action of its moving means for another incremental or indexing feed motion preparatory to the next ruling motion of the tool. It will thus be seen that the extent of this incremental feed motion is in no way dependent upon any feed screws or intermittent rotating feed mechanism which are exceedingly difficult to accurately construct, but the extent of the motion of each feed is determined by the extent of the lost motion connection between the carriages 4 and 5 which can be accurately determined and be the same for each actuation.

The tool 80 for ruling the work is carried by a carrier 81 mounted for motion transverse to the motion of the carriages 4 and 5. This carrier 81, as shown best in Figure 5, is centrally cut away as at 82 on its under face so as to clear the work support and the work on the carriage 4, and it is supported for transverse motion on a three point rolling support. Two of these supporting points as shown comprise balls 83 which are supported between pairs of rods 84 and 85 of circular cross section, the rods 85 being secured in a channel 86 in the wall member 91 and the rods 84 being secured in a similarly opposed channel 87 in the lower face of the carrier 81. By supporting the balls in this manner they are provided with line contacts with their bars 84 and 85, and in order that any inaccuracies tending to rock the carrier about these balls shall have as little effect as possible on the accuracy of ruling, the tool 80 is arranged with its ruling point in line with the common axis of the balls 83. A third rolling contact for supporting the carrier 81 is between an upstanding portion 90 of the carrier and the wall member 91 extending upwardly from the support 1 and as shown being in the form of a bracket secured as by screws 92 to the top face of the support 1. The central portion of this member 91 is cut away as at 93 to bridge over the guide bars 2 and 3 and the work carriage 4 with the work supported thereon. This third rolling contact comprises the ball 100 located between accurately fixed members 101 and 102 carried by the portions 81 and 91, respectively. The ruling tool itself is shown as carried by a threaded plug 104 adjustably threaded into a yoke member 105 having ball trunnions 106 engaging in the ends of oppositely disposed plugs 107 and 108 in spaced depending flanges 109 and 110 of the carrier.

As shown best in Figure 5, this plug 104 is arranged at one side of the trunnion axis afforded by the balls 106 so that by rocking the yoke member 105 the ruling tool can be lifted from the work or allowed to bear thereon. Means are provided by which during one direction of traverse of the carrier, the ruling tool is in operative engagement with the work and during the other direction of traverse it is out of operative position. Mechanism for doing this is shown best in Figure 5. Carried by the yoke member 105 on the opposite side of the pivot from the tool is an abutment member 112 in alinement with which a pin 113 is vertically slidable through the carrier 82. This pin is normally held elevated as by a spring 114 reacting between its head 115 and the upper face of the carrier 82 and above this head there is positioned a bar 116 axially slidable through openings in a pair of supports 117 upstanding from the carrier 82. The lower face of this bar 116 is provided with a notch 118 and when this bar is in the axial position shown in Figure 5, this notch 118 is above the pin 114 so that this pin is retracted and the ruling tool is in its operative position. By moving the bar 116 axially, however, the notch 118 may be brought out of alinement with the head of the pin 113, causing this pin to be depressed and raising the ruling tool into inoperative position. As the carrier is moved from one to the other side, this bar 116 alternately impinges on adjustable stops 120 mounted in brackets 121 secured to the wall member 91, so that the bar 116 is moved alternately into two axial positions, in one of which it allows the ruling tool to engage the work and in the other of which it holds the ruling tool out of such engagement.

Means are provided for reciprocating this carrier to move the tool back and forth across the work. As shown this means comprises a crank disk 125 secured to one end of the shaft 73 and having a cross slot 126 within which may be adjustably secured a crank pin 127 so as to adjust the amplitude of motion of the tool carrier. This crank pin is connected through an arm 128 with a slide 129 having a slot 130 therethrough through which the shaft 73 projects. This slide 129 is mounted on suitable ways in a guide portion 132 of the bracket 60 and its inner end is connected through a relatively light thrust rod 133 to the carrier 83. This thrust rod serves to impart substantially only pull and thrust motion to the carrier, avoiding substantially entirely any vertical components such as are imparted to the slide 129 through its driving crank mechanism.

While as shown, the stop carriage 5 is in advance of the work carriage 4, the direction of motion of these two carriages along the bar 2 is immaterial, and they might be moved in the opposite direction. For this purpose a second bracket 28' carrying another pair of pulleys 27' and a stop screw 29' is shown as secured to that end of the support adjacent to the wall member 91, and these pulleys would be used to support the cords 26 for feed of the carriage 4 in advance of the carriage 5. Any desired length of grating within the capacity of the machine may be ruled.

From the foregoing description of an embodiment of this invention it will be evident to those skilled in the art that various changes and modifications may be made without departing from the spirit or scope of this invention.

I claim:

1. A machine of the class described, comprising a pair of carriages, means supporting said carriages for motion in one direction, means connecting said carriages together with lost motion in said direction, means for moving said carriages in said direction alternately by the amount of said lost motion, a carrier mounted for motion transverse to said direction, means supporting a pair of elements one comprising a work piece and one comprising a tool, one of said elements being supported by one of said carriages and the other of said elements being supported by said carrier in position for the tool to operate on the work piece during one of said motions, and means for moving said carrier.

2. A machine of the class described, comprising a work carriage, a stop carriage, means supporting said carriages for motion in a common rectilinear path one carriage being positioned back of the other carriage, means independent for said carriages tending to move said carriages forwardly, a tool carrier mounted for motion transverse to the motion of said carriages, a tool on said carrier for operation on work on said work carriage, a lost motion connection between said carriages, means independent for each carriage for holding its respective carriage against motion, means actuating said holding means alternately to permit motion of one of said carriages to the extent of said lost motion while the other carriage is stationary and with a period when both carriages are so held, and means acting during said period to move said carrier to cause said tool to draw a line on the work.

3. A machine of the class described, comprising a work carriage, a stop carriage, means supporting said carriages for motion in a common rectilinear path one carriage being positioned back of the other carriage, means independent for said carriages tending to move said carriages forwardly, a tool carrier mounted for motion transverse to the motion of said carriages, a tool on said carrier for operation on work on said work carriage, an abutment on one of said carriages, a yoke carried by the other of said carriages for engagement with each side of said abutment in the direction of motion of said carriages and with a predetermined extent of lost motion in the direction of motion of said carriages, means independent for each carriage for holding its respective carriage against motion, means actuating said holding means alternately to permit motion of one of said carriages to the extent of said lost motion while the other carriage is stationary and with a period when both carriages are so held, and means acting during said period to move said carrier to cause said tool to draw a line on the work.

4. A machine of the class described, comprising a support, a guide bar carried by said support, a work carriage and a stop carriage mounted on said support in alinement with each other for motion along said guide bar, means individual to each of said carriages tending to move said carriages in the same direction, a tool carrier mounted for motion on said support transverse to the direction of motion of said carriages, a tool on said carrier in position to engage work on said carriage, a lost motion connection between said carriages, means individual to each carriage for clamping its respective carriage against said guide bar, means for alternately actuating said clamp to release one of said carriages for motion by the amount of such lost motion through the action of its motion producing means and while the other carriage remains clamped and to then clamp said one carriage and thereafter to release the other carriage for motion along said bar by the amount of said lost motion and then to clamp said other carriage, and means acting when both carriages are clamped and between successive motions of said work carriage to actuate said carrier to cause said tool to mark the work.

5. In a ruling engine, a support, a pair of alined carriages each having a three point rolling contact with said support, a guide bar along which said carriages may move, means individual to each carriage tending to move said carriages in the same direction, a lost motion connection between said carriages, means individual to each carriage for clamping the respective carriage to said guide bar, and means actuable to serially actuate said clamping means to release one of said carriages for motion equal to said lost motion while the other carriage is clamped and then to release said other carriage for motion equal to said lost motion while said one carriage is clamped, whereby said work carriage progresses along said guideway by successive feed increments each equal to the amount of said lost motion.

6. In a ruling engine, a support, a pair of alined carriages each having a three point rolling contact with said support, a guide bar along which said carriages may move, means individual to each carriage tending to move said carriages in the same direction, a lost motion connection between said carriages, means individual to each carriage for clamping the respective carriage to said guide bar, each of said clamping means including a spring for applying clamping pressure of a uniform amount at each clamping action, and means actuable to serially actuate said clamping means to release one of said carriages for motion equal to said lost motion while the other carriage is clamped and then to release said other carriage for motion equal to said lost motion while said one carriage is clamped, whereby said work carriage progresses along said guideway by successive feed increments each equal to the amount of said lost motion.

7. In a ruling engine, a support having an upstanding wall portion, a carrier mounted on said support for motion along said wall portion, said mounting comprising a three point rolling contact, one of said points being located at said wall portion.

8. In a ruling engine, a support having an upstanding wall portion, a carrier mounted on said support for motion along said wall portion, said mounting comprising a three point rolling contact, one of said points being located at said wall portion, at least one of said contacts comprising pairs of rods cylindrical in cross section supported in parallel relation on said support and carrier and a ball interposed between said pairs of rods.

9. In a ruling engine, a support, a carrier mounted on said support for motion in one direction, said mounting comprising a three point rolling contact, at least one of said contacts comprising pairs of rods cylindrical in cross section supported in parallel relation on said support and carrier, and a ball interposed between said pairs of rods.

10. In a ruling engine, a support, a work carriage mounted on said support for indexing motion in one direction, a wall member upstanding from said support and bridging over said work carriage transverse to the line of motion of said work carriage, and a tool carrier having a tool support above said work carriage, said tool carrier having a two point bearing on said support, one point on each side of said carriage, and a third point bearing on said wall member.

11. In a ruling engine, a support, a work carriage mounted on said support for indexing motion in one direction, a wall member upstanding from said support and bridging over said work carriage transverse to the line of motion of said work carriage, a tool carrier having a tool support above said work carriage, said tool carrier having a two point bearing on said support, one point on each side of said carriage, and a third point bearing on said wall member and a tool having an active portion in substantial alinement with the points of said two point bearing.

12. In a ruling engine, a support, a work carriage mounted on said support for indexing motion in one direction, a wall member upstanding from said support and bridging over said work carriage transverse to the line of motion of said work carriage, a tool carrier having a tool support above said work carriage, said tool carrier having a two point bearing on said support, one point on each side of said carriage, and a third point bearing on said wall member, each of said bearings comprising a single ball, and a tool having an active portion in substantial alinement with a common axis of the balls of said two point bearing.

13. A machine of the class described comprising a support, a work carriage mounted on said support for indexing motion in one direction, a tool carrier mounted on said support for motion transverse to the line of motion of said work carriage, a tool carried by said carrier in position to act upon work on said work carriage, said carrier mounting including a pair of supporting balls between said carrier and support spaced in the line of motion of said carrier, said tool when in work-engaging position lying in substantial alinement with the common axis of said pair of balls, means for indexing said work carriage, and means for moving said tool carrier in the intervals between the indexing of said work carriage.

14. In a ruling engine, a support, a carrier mounted on said support for motion in one direction, said mounting including a pair of balls interposed between said carrier and support and spaced in the line of motion of said carrier, and a tool carried by said carrier with its active portion in substantial alinement with the common axis of said pair of balls.

ROBERT R. FINN.